(12) United States Patent
Ko et al.

(10) Patent No.: US 8,296,652 B2
(45) Date of Patent: *Oct. 23, 2012

(54) METHOD FOR PRINTING WEB PAGES INCLUDED ADVERTISEMENT

(75) Inventors: Junyong Ko, Gyeonggi-do (KR); Nakchul Sung, Gyeonggi-do (KR)

(73) Assignee: Designmade Co., Ltd., Seoul (KR)

( * ) Notice: Subject to any disclaimer, the term of this patent is extended or adjusted under 35 U.S.C. 154(b) by 533 days.

This patent is subject to a terminal disclaimer.

(21) Appl. No.: 12/298,534

(22) PCT Filed: Jul. 5, 2007

(86) PCT No.: PCT/KR2007/003272
§ 371 (c)(1),
(2), (4) Date: Oct. 26, 2008

(87) PCT Pub. No.: WO2008/020677
PCT Pub. Date: Feb. 21, 2008

(65) Prior Publication Data
US 2009/0193336 A1    Jul. 30, 2009

(30) Foreign Application Priority Data
Aug. 17, 2006  (KR) .......................... 10-2006-0077499

(51) Int. Cl.
*G06F 17/00*    (2006.01)

(52) U.S. Cl. .................. 715/274; 358/1.15; 715/234
(58) Field of Classification Search .................. 715/238, 715/240, 205, 206, 234, 243, 760, 808; 705/14.1, 705/14.22, 14.39, 14.4, 14.64, 14.72, 14.73; 358/1.15
See application file for complete search history.

(56) References Cited

U.S. PATENT DOCUMENTS

| | | | | |
|---|---|---|---|---|
| 7,088,465 B2 * | 8/2006 | Bates et al. | .................. | 358/1.15 |
| 7,180,615 B2 * | 2/2007 | Price et al. | .................... | 358/1.15 |
| 7,532,336 B2 * | 5/2009 | Nagai | .......................... | 358/1.13 |
| 7,706,010 B2 * | 4/2010 | Ko et al. | ...................... | 358/1.15 |
| 2002/0178180 A1 * | 11/2002 | Kolosova et al. | ............. | 707/500 |
| 2005/0262441 A1 * | 11/2005 | Yoon | ............................ | 715/526 |
| 2006/0156229 A1 * | 7/2006 | Morgan | ....................... | 715/527 |
| 2006/0290976 A1 * | 12/2006 | Ko et al. | ..................... | 358/1.15 |

* cited by examiner

*Primary Examiner* — Cesar Paula
*Assistant Examiner* — Nathan Shrewsbury
(74) *Attorney, Agent, or Firm* — LRK Patent Law Firm

(57) ABSTRACT

A method for printing a web page with an advertisement is provided. When a web user wants to print a specific web page of a web site, a web printing exclusive viewer operates and then the specific web page is automatically adjusted to be fit into a printing area of a web browser. Then, the web page with an advertisement related to the contents of a current web page, provided from the web server, is printed, and the web server automatically counts a page view while printing the web page, such that an accurate total page view count value can be obtained.

6 Claims, 6 Drawing Sheets

[Fig. 1]

Prior Art

[Fig. 2]
Prior Art
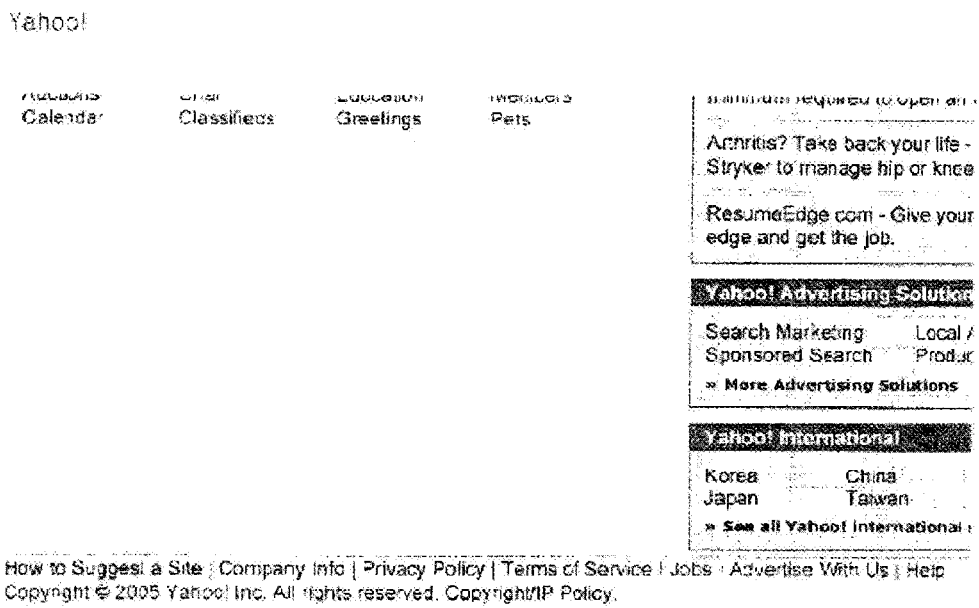

METHOD FOR PRINTING WEB PAGES INCLUDED ADVERTISEMENT

BACKGROUND OF THE INVENTION

1. Field of the Invention

The present invention relates to a method for printing a web page with an advertisement, and more particularly, to a method for printing a portion or entire web page contents with a related advertisement by automatically adjusting the size of a web page to be fitted into a printing area of a web browser.

2. Description of the Related Art

According to a widely-used web printing method, after a user starts a web browser, a specific web page can be printed on a predetermined printing paper set by default while being connected to a specific web page of a web server, as a result of selecting a print button of the web browser.

However, if the size of the web page in the web browser exceeds a printing paper size, there is a problem in that a specific area of the web page (e.g., a right end portion of the web page) is printed on the printing paper with a cut portion because the web page is printed on the printing paper in a portrait mode by default regardless of the size of the web page. Thus, the printing paper can be wasted and it may be also quite frustrating for the user.

Actually, as illustrated in FIGS. 1 and 2, a home page of the Yahoo portal site is printed on two A4 papers with a right portion cut, as a result of selecting a print menu of a Microsoft Internet Explorer (i.e., a web browser).

On the other hand, the cut portion of the specific web page to be printed can be eliminated by switching from a portrait mode, which is set by default, to a landscape mode or changing the printing paper area in the portrait mode.

However, it is cumbersome to change a direction of the printing paper and a printing area (e.g. reducing a right margin) by selecting the print menu each time printing the web page. Moreover, when the portrait mode is changed into the landscape mode, there is a still problem in that a right end portion is cut off when printing the web page with a width longer than that of the printing paper.

Additionally, in the conventional method for printing a specific web page by selecting the print menu, it is cumbersome for the user to copy corresponding contents from the web page, paste them on an additional word processor (e.g. MS word or Hangeul 2002), and print them when the user wants to print a necessary portion among the entire contents of the web page.

On the other hand, conventional web sites place conventional advertisements such as banners and pop-ups in spaces of web pages to draw web users.

However, there is a limitation in maintaining advertisement effects because the web user only can be attracted to the conventional advertisement such as banners and pop-ups while being connected to the corresponding web sites in real-time. Furthermore, if someone intentionally want to manipulate page views of banners or pop-ups (e.g., someone periodically and intentionally selects specific banner advertisement several times), an advertiser may not accurately measure effective on-line advertisements because of an index of page views can be forged. In addition, the web user can be vulnerably exposed to unwanted banner and pop-up advertisements, such that the number of the web users, who no longer want to visit the web site with annoying advertisements, drastically increases.

SUMMARY OF THE INVENTION

Accordingly, the present invention is directed to a method for printing a web page with and advertisement that substantially obviates one or more problems due to limitations and disadvantages of the related art.

An object of the present invention is to provide a method for printing a web page with an advertisement, the method including requesting for printing contents of a specific web page of a web site after a user runs a web browser that is connected to the specific web site, running a web printing exclusive viewer separated from a web printing viewer of the web browser, generating a web page image by automatically adjusting the size of a current web page to be fit into a printing area of the web browser after scroll-capturing the corresponding web page, displaying the web page image in a web printing exclusive control window, printing the web page with an advertisement related to contents of the current web page provided from a web server after automatically adjusting the web page image to be fit into the printing area of the web browser when a print button is selected from a print menu of the web printing exclusive control window, and printing contents related to a selected area in the web page that is automatically adjusted to be fit into the printing area of the web browser and an advertisement related to the contents of the web page provided from the web server after a select area button is selected and a specific area is selected from the web page image.

An another object of the present invention is to provide a method for printing a web page with an advertisement to obtain a reasonable and accurate page view count value with respect to a corresponding web page in a web server by requesting a page view up-count to the web server while printing and saving a web page with an advertisement related to contents of the current web page, which is automatically adjusted to be fit into a printing area of the web browser.

According to an aspect of the present invention, there is provided a method of printing a web page with an advertisement, the method including: requesting for printing a specific web page of a corresponding web site while being connected to a web site of a specific web server after a web user runs a web browser; downloading a web printing exclusive viewer into a personal computer (PC) of the web user from the web sever of the corresponding web site if there is a request for printing a web page; scroll-capturing the web page to generate an initial web page image by automatically adjusting a size of a current web page to be fit into a printing area of the web browser while the web printing exclusive viewer downloaded to the PC of the web user operates separate from a web printing viewer provided from a web browser; downloading advertisement information related to the corresponding web page into the PC of the web user from the web server when the initial web page image is generated; generating an advertisement image corresponding to the advertisement information related to the web page downloaded to the PC of the web user in the web printing exclusive viewer; determining whether a size of the initial web page image exceeds a printing pager size of the web browser; displaying the initial web page image with the advertisement image in a web printing exclusive control window and requesting a page view up-count by the web printing exclusive viewer if the size of the initial web page image does not exceed the printing paper size of the web browser; after the web printing exclusive viewer divides the initial web page image with the advertisement image into a plurality of web page images if the size of the initial web page image exceeds the printing paper size of the web browser, displaying a first web page image among the plurality of web page images in the web printing exclusive control window and displaying sequentially remaining web page images each time selecting a move button in a print menu of the web printing exclusive control window; and requesting a page view up-count to the web server by the web printing exclusive viewer and then printing a web page with an advertisement through a printer connected to the PC of the web user if a print button is selected from the print menu while the web page image is displayed in the web printing exclusive control window, the web page being automatically adjusted to be fit into the printing area of the web browser the advertisement being related to a corresponding web page.

The generating of the initial web page image may include generating an initial web page image of a bitmap type.

The generating of the initial web page image with an advertisement image may include generating an advertisement image of a bitmap type inserted into a top or a bottom of the initial web page image.

After selecting a select area button from the print menu of the web printing exclusive control window and then selecting a specific area from the web page image displayed in the web printing exclusive control window, the method further may include: printing a web page through a printer connected to the PC of the web user after the web printing exclusive viewer requests the page view up-count to the web server, the web page including contents and an advertisement, the web page corresponding to the selected area among entire contents of the web page that is automatically adjusted to be fit into the printing area of the web browser, the advertisement being related to the corresponding web page.

After the web printing exclusive viewer divides the initial web page image with the advertisement image into a plurality of web page images if the size of the initial web page image exceeds the printing paper size of the web browser while a first web page image among the plurality of web page images is displayed in the web printing exclusive control window, the method further may include: combining the initial web page image with the advertisement in a plurality of web page images into one web page image to be printed on one printing paper through a printer connected to the PC of the web user after the web user selects a page setting button from the print menu of the web printing exclusive control window and the web printing exclusive viewer requests a page view up-count to the web server when selecting the print button.

If a save button is selected from the print menu while the web page image is displayed in the web printing exclusive control window, the method further may include: saving a web page with an advertisement related to a corresponding web page after the web printing exclusive viewer requests a page view up-count to the web server, the web page being automatically adjusted to be fit into the printing area of the web browser.

According to the present invention, the problem in cutting a right end portion of the specific web page to be printed can be resolved, and a portion among entire contents of the web page can be easily and selectively printed on a printing paper without aid of an additional word processor.

Additionally, because an advertisement related to a web page can be printed on a printing paper, the present invention is not limited to conventional banner and pop-up advertisements, which are effective on-line advertisements only when web users are connected to web sites in real time and can continuously maintain on-line advertisement effects through the printed web page.

Especially, each time a web page with an advertisement that can be printed on one or two printing pages (e.g., A4 paper) set by default in the web browser is displayed in a web printing exclusive control window and the web page with an advertisement is printed or saved into a PC of the web user as an image file, a web server automatically changes page view count value. Therefore, an accurate page view count value through the request for page view up-count can be achieved. As a result, an advertiser can easily and accurately confirm on-line advertisement effects based on an index of page views.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 1 and 2 are a Yahoo home page after using a print menu provided from a Microsoft Internet Explorer;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 3:
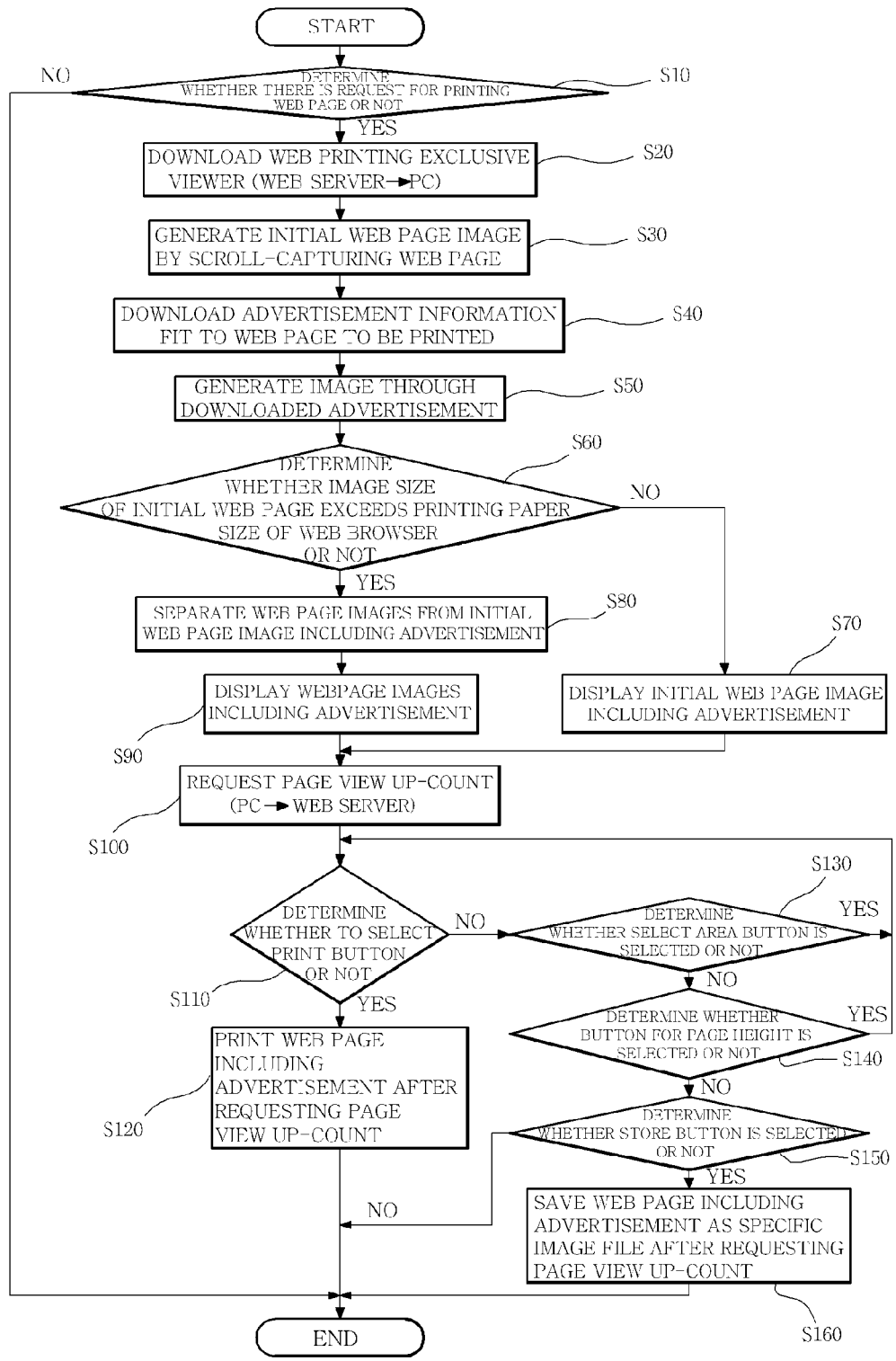
FIG. 3 is a flowchart illustrating a method for printing a web page with an advertisement according to an embodiment of the present invention.

According to a method for printing a web page with an advertisement, as illustrated in FIG. 3, let's assume that a personal computer (PC) of a web user is connected to a web site of a specific web server through internet and also connected to a printer. Also, each web page of the web site has a print button for printing a web page that the web user selects.

The web server includes database (DB) storing advertisement information related to a corresponding web page in correspondence to each web page in the web site.

Firstly, a web user starts a web browser of a PC and request for printing a corresponding web site while being connected to a web site of a specific server by selecting a print button of the specific web page in operation S10. Then, the PC of the web user downloads a web printing exclusive viewer from the web server to print the specific web page with an advertisement in operation S20.

Accordingly, the web printing exclusive viewer downloaded into the PC of the web user operates separated from a web printing viewer of the web browser, scroll-captures the corresponding web page from the y-axis starting point to the y-axis ending point of the web page and from the x-axis starting point to the x-axis ending point, and then automatically adjusts the size of the scroll-captured image to be fit into a printing area of a printing paper in the web browser in operation S30.

Once the initial web page image is created, the web server reads advertisement information related to the corresponding web page from the DB and downloads the information into the PC of the web user in operation S40. Accordingly, the web printing exclusive viewer downloaded into the PC of the web user generates an image of a bitmap, which may be inserted into the top or the bottom of the initial web page by using an advertisement image corresponding to the advertisement information related to the currently-downloaded web page in operation S50. The advertisement image may be generated to be inserted into the left or the right of the initial web page image if necessary.

Figure 1:
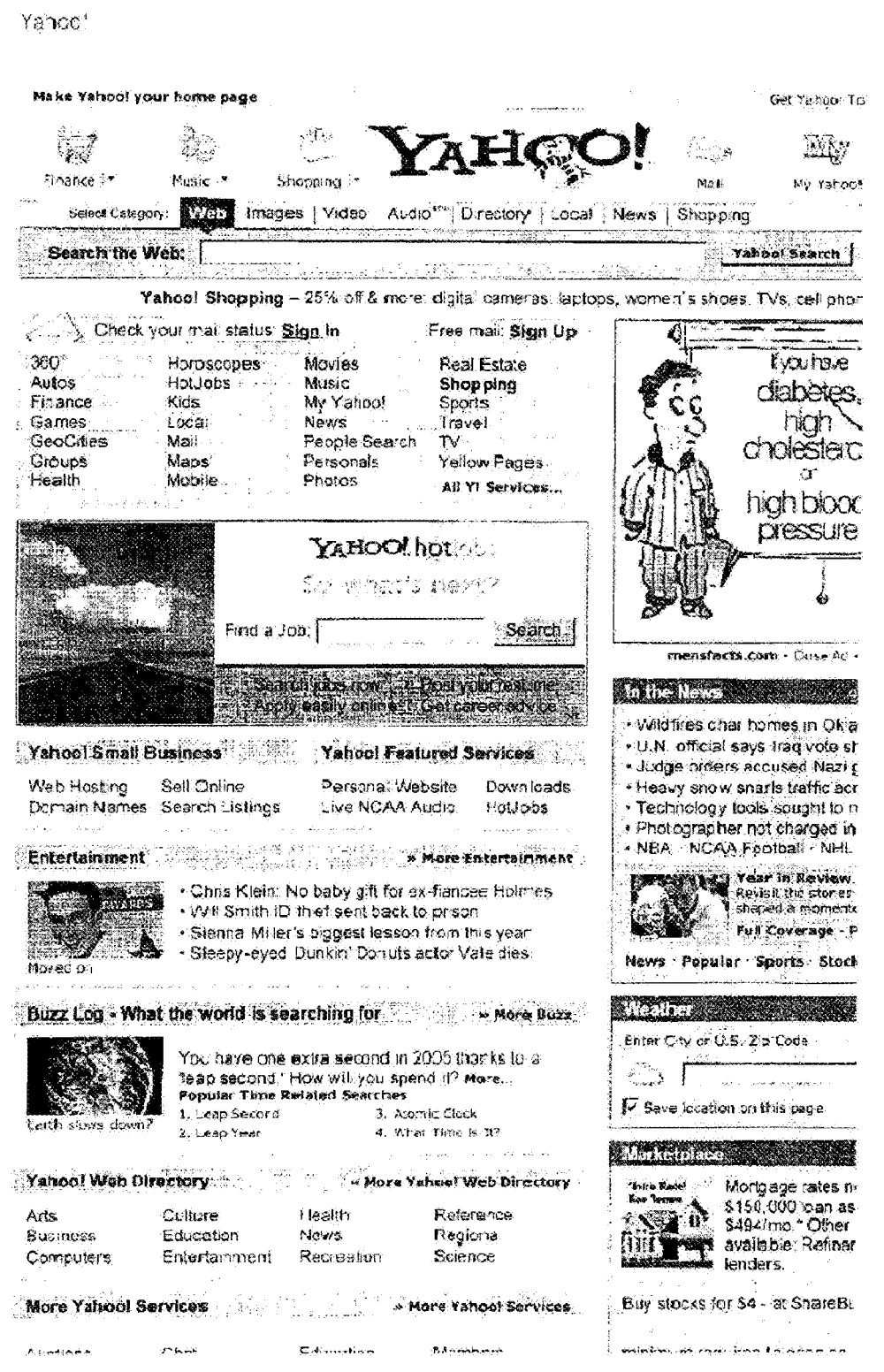

Once the initial web page image and the advertisement image that can be inserted into the top or the bottom of the initial web page image are generated, since the scroll-captured current web page may have a size that can be printed one printing paper or two printing papers as illustrated in FIGS. 1 and 2, the web printing exclusive viewer determines whether the size of the initial web page image exceeds the size of a printing paper (e.g., A4 size) set by default in the web browser in operation S60.

Figure 4:
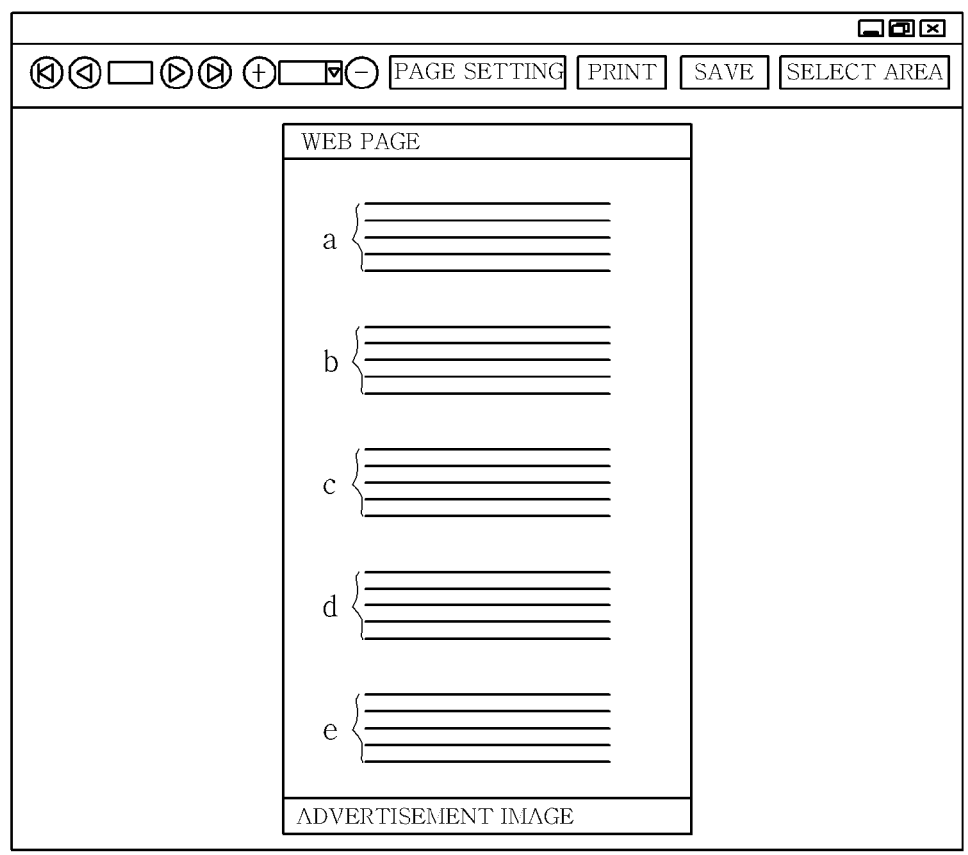
FIG. 4 is a web page image displayed on a web page printing control window according to another embodiment of the present invention.
Figure 5:
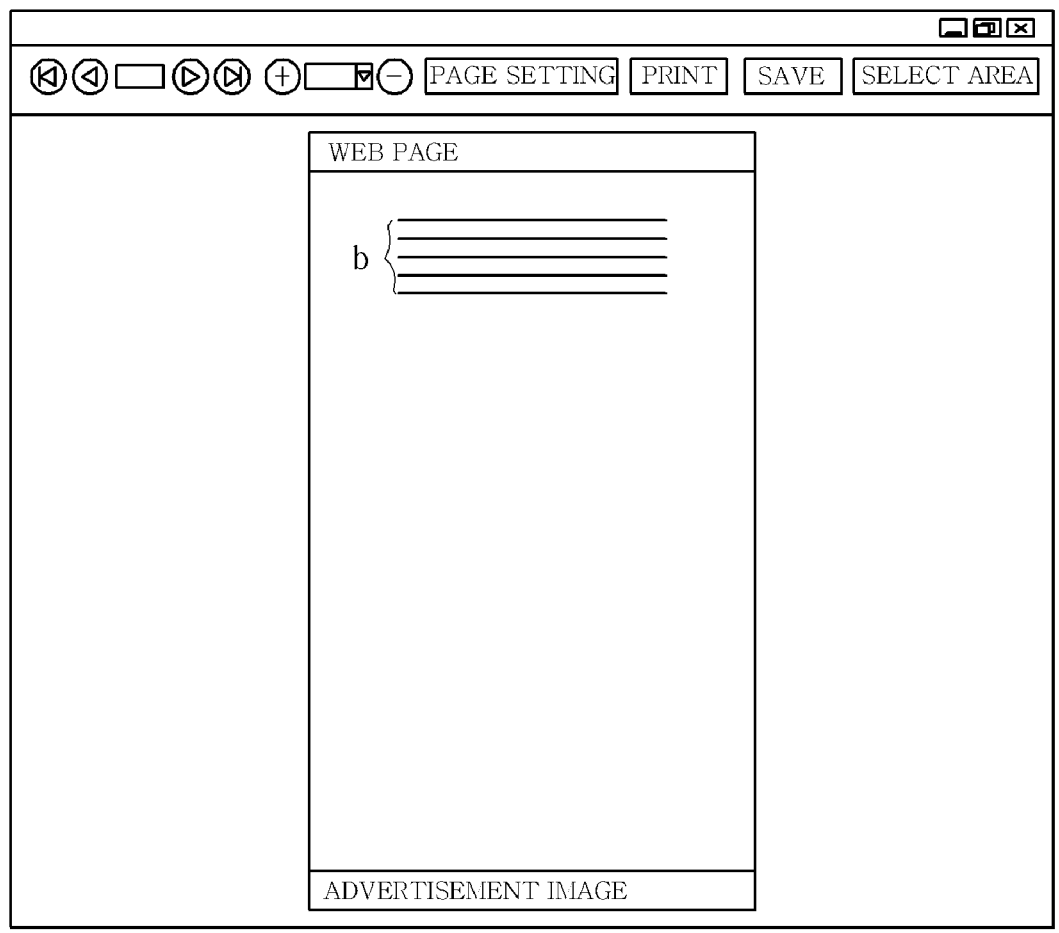
FIG. 5 is a portion of a web page image displayed on a web printing control window according to another embodiment of the present invention.

If the size of the initial web page image does not exceed the printing paper size of the web browser, the web printing exclusive view displays the initial web page image with the advertisement image in a web printing exclusive control window of FIG. 4 and requests a page view up-count to the web server in operations S70 and S100.

This case corresponds to when the current web page can be printed on one printing paper (e.g., A4 paper) set by default in the web browser. The advertisement image is inserted into the bottom of the web page image.

Additionally, once the page view up-count request of the web printing exclusive viewer is delivered to the web server, a total accumulated page view value with respect to the current web page is counted up by 1.

Unlike this, when the size of the web page exceeds the printing page, the initial web page is divided into a plurality of web pages by the web printing exclusive viewer in operation S80. Then, a web page image with a first advertisement image among the plurality of web pages is displayed on the web printing exclusive control window, and then the web printing exclusive viewer requests a page view up-count, and also the rest of the web pages are displayed sequentially each time a page move button is selected in the print menu of the web printing exclusive control window in operation S90. In this case, the current web page is printed on the two printing pages (e.g., two A4 papers) set by default in the web browser as illustrated in FIGS. 1 and 2.

At this point, once the page view up-count request of the web printing exclusive viewer is delivered to the web server, a total accumulated page view value with respect to the current web page is counted up by 1.

For reference, the web printing exclusive control window illustrated in FIG. 4 includes the print menu part and a display window part. The print menu part includes page moving buttons (|<, ◁▷, ▷|), page enlarge/reduce buttons (+,−), a page setting button, a print button, a save button, and a select area button. The display window part displays the web page image.

The page moving buttons (|<, ◁▷, ▷|) select and display one of the web page images that are created before by dividing the initial web page image with an advertisement image into a plurality of web page images. The page enlarge/reduce buttons (+,−) enlarge or reduce the web page image with the advertisement image in the current display window.

The page setting button can diversely set the web page image displayed on the current display window part to be fitted into a page width, a page height, a page, or an actual size. The print button prints the web page image.

The save button saves the web page image with the advertisement image as a specific image file in the PC of the web user, and the select area button prints a specific area of the web page, which is selected by the web user.

In operations S70 and S90, the web page image with an advertisement, which can be printed on one or two printing papers (e.g., A4 paper) set by default in the web browser, is displayed in the web printing exclusive control window, and then the web user presses the print button while the page view up-count request of the web printing exclusive view is delivered into the web server in operation S110. The web printing exclusive viewer requests the page view up-count to the web server and prints the web page with an advertisement, which is automatically adjusted to be fit into the printing area of the web browser, by means of a printer connected to the PC of the web user in operation S120.

Figure 6:
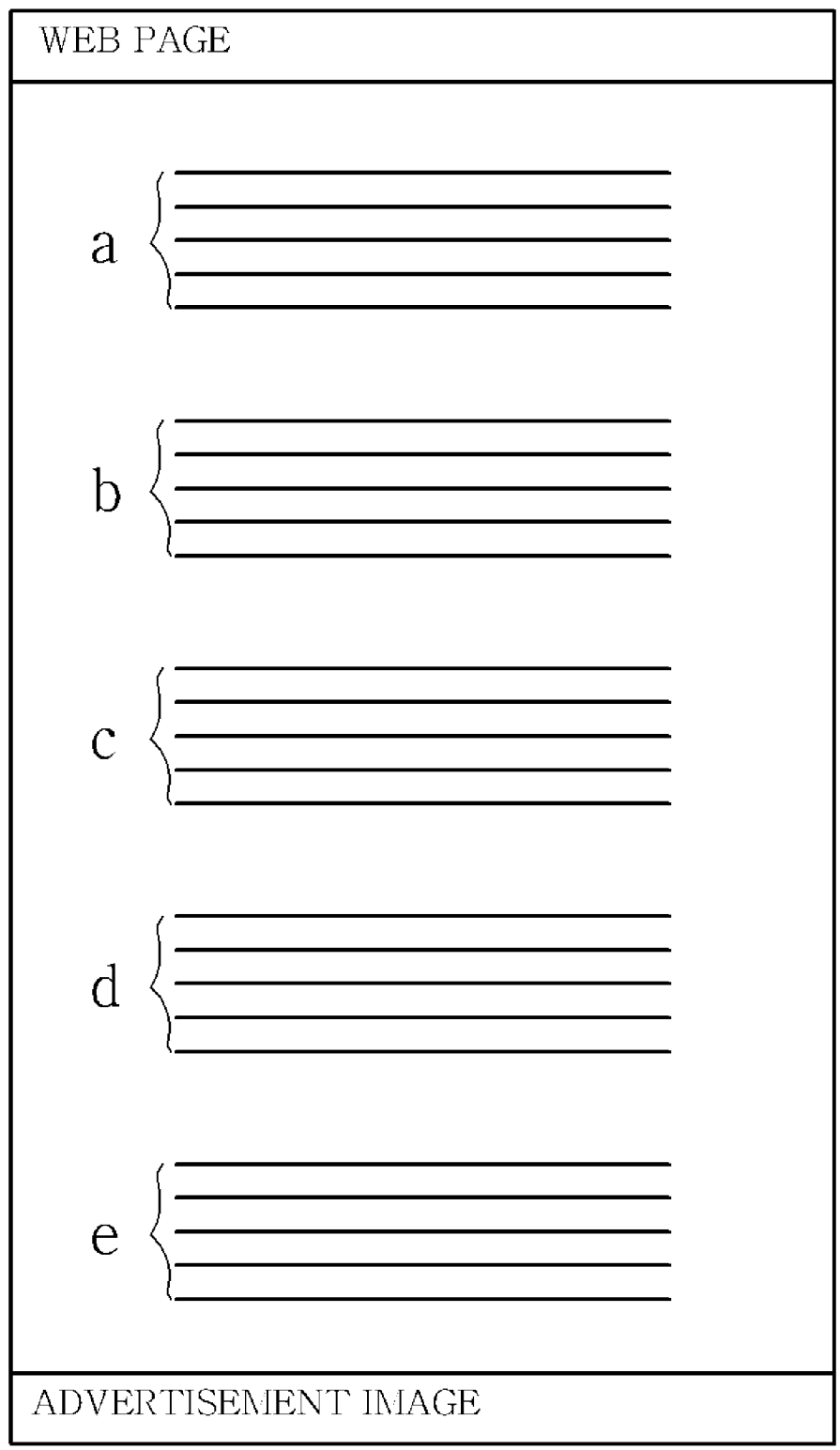
FIG. 6 is a view of a printing page when the web page image of FIG. 4 is printed.

At this point, the initial web page image with an advertisement corresponding to the current web page can be printed on one printing paper (e.g., A4 paper) set by default in the web browser, without the right end portion cut as illustrated in FIG. 6. The initial web page image, which is divided into a plurality of web page images with respective advertisement images related to corresponding current web page, can be printed on two printing papers without the right end portion cut unlike FIGS. 1 and 2, whose can be printed on more than two printing papers (e.g., more than two A4 papers) set by default in the web browser.

Additionally, while the page view up-count request of the web printing exclusive viewer is delivered into the web server, the web server counts up a total accumulated page view value by 1 with respect to the web server.

Hereinafter, additional functions according to a method for printing a web page with an advertisement will be described in more detail.

Firstly, a web page image with an advertisement, which can be printed on one or more than two printing papers set by default in the web browser, is displayed in the web printing exclusive control window in operations S70 and S90. When the page view up-count request of the web printing exclusive viewer is delivered to the web server, a web user does not select the print button in operation S110, and controls a mouse to select a specific area among the web page image with an advertisement in the web printing exclusive control window after pressing a select area button in the print menu of the web printing exclusive control window in operation S130 and presses the print button in operation S110. Then, the web printing exclusive view requests a page view up-count to the web server and prints the web page including the selected contents and the advertisements corresponding to the selected area among the contents of the web page, which is adjusted to be fit into the size of the printing area of the web browser, through the printer connected to the PC of the web user in operation S120.

For example, as illustrated in FIG. 4, when a specific web page image including contents a, b, c, d, and e and specific advertisements is displayed in the web printing exclusive control window in operations S70 and S90, the web user presses the select area button and controls the mouse to select a specific area b from the web page image with advertisements in the web printing exclusive control window in operation S130. Then, the web page including contents corresponding to the area b selected from the web page contents and the specific advertisement, which is automatically adjusted to be fit to the printing area of the web browser, is printed through the printer connected to the PC of the web user in operation S120.

Accordingly, the web user can select and print the necessary portion of the specific web page.

At this point, while the page view up-count request of the web printing exclusive viewer is delivered into the web server, the web server counts up a total accumulated page view value by 1 with respect to the current web page.

Secondly, as similar to examples of FIGS. 1 and 2, when a web page image with an advertisement, which can be printed on one or more than two printing papers set by default in the web browser, is displayed in the web printing exclusive control window (i.e., when the size of the initial web page image exceeds the size of the print paper (e.g., A4 paper) of the web browser), the web printing exclusive viewer divides the initial web divides page images with the advertisement image into more than two web page images, and then displays the web page image with the first advertisement image among the web page images with more than two advertisements in the web printing exclusive control window in operation S90. The web user does not directly presses the print button in operation S110 and selects the page height button from the page setting menu, which includes a page width button, a page height button, a actual size button, after pressing the page setting button in the print menu of the web printing exclusive control window in operation S140. Then, when the web user selects the print button in operation S110, the web printing exclusive viewer request the page view up-count to the web server, and combines the initial web page with the advertisement, which is divided into more than two web page images, for the web page image with one advertisement to be printed on one print paper through the printer connected to the PC of the web user.

At this point, while the page view up-count request of the web printing exclusive view is delivered to the web server, the web server counts up the total accumulated page view value by 1 with respect to the current web page.

Thirdly, a web page image with advertisements, which can be printed on one or more than two printing papers set by default in the web browser, is displayed in the web printing exclusive control window in operations S70 and S90. The web user does not directly presses the print button in operation S110 and selects the save button in the print menu of the web printing exclusive viewer in operation S150. Then, the web printing exclusive view request the page view up-count and saves the web page including advertisement, which is automatically adjusted to fit into the printing area of the web browser, as a specific file format (e.g., a bmp file, a tif file, a jpeg file, a pdf file, etc.) in the PC of the web user in operation S160.

Accordingly, the web user reads the specific file stored in the PC without being connected to the specific web page, and prints the web page with the specific advertisement if necessary.

At this point, while the page view up-count request of the web printing exclusive view is delivered to the web server, the web server counts up the total accumulated page view value by 1 with respect to the current web page.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of printing a web page with an advertisement, comprising:
    requesting for printing a specific web page of a corresponding web site while being connected to a web site of a specific web server after a web user runs a web browser;
    downloading a web printing exclusive viewer into a personal computer (PC) of the web user from the web sever of the corresponding web site if there is a request for printing a web page;
    scroll-capturing the web page to generate an initial web page image by automatically adjusting a size of a current web page to be fit into a printing area of the web browser while the web printing exclusive viewer downloaded to the PC of the web user operates separate from a web printing viewer provided from a web browser;
    downloading advertisement information related to the corresponding web page into the PC of the web user from the web server when the initial web page image is generated;
    generating an advertisement image corresponding to the advertisement information related to the web page downloaded to the PC of the web user in the web printing exclusive viewer;
    determining whether a size of the initial web page image exceeds a printing paper size of the web browser;
    displaying the initial web page image with the advertisement image in a web printing exclusive control window and requesting a page view up-count by the web printing exclusive viewer if the size of the initial web page image does not exceed the printing paper size of the web browser;
    after the web printing exclusive viewer divides the initial web page image with the advertisement image into a plurality of web page images if the size of the initial web page image exceeds the printing paper size of the web browser, displaying a first web page image among the plurality of web page images in the web printing exclusive control window and displaying sequentially remaining web page images each time selecting a move button in a print menu of the web printing exclusive control window; and
    requesting a page view up-count to the web server by the web printing exclusive viewer and then printing a web page with an advertisement through a printer connected to the PC of the web user if a print button is selected from the print menu while the web page image is displayed in the web printing exclusive control window, the web page being automatically adjusted to be fit into the printing area of the web browser the advertisement being related to a corresponding web page.

2. The method of claim 1, wherein the generating of the initial web page image comprises generating an initial web page image of a bitmap type.

3. The method of claim 1, wherein the generating of the initial web page image with an advertisement image comprises generating an advertisement image of a bitmap type inserted into a top or a bottom of the initial web page image.

4. The method of claim 1, wherein after selecting a select area button from the print menu of the web printing exclusive control window and then selecting a specific area from the web page image displayed in the web printing exclusive control window, further comprising: printing a web page through a printer connected to the PC of the web user after the web printing exclusive viewer requests the page view up-count to the web server, the web page including contents and an advertisement, the web page corresponding to the selected area among entire contents of the web page that is automatically adjusted to be fit into the printing area of the web browser, the advertisement being related to the corresponding web page.

5. The method of claim 1, wherein after the web printing exclusive viewer divides the initial web page image with the advertisement image into a plurality of web page images if the size of the initial web page image exceeds the printing paper size of the web browser while a first web page image among the plurality of web page images is displayed in the web printing exclusive control window, further comprising: combining the initial web page image with the advertisement in a plurality of web page images into one web page image to be printed on one printing paper through a printer connected to the PC of the web user after the web user selects a page setting button from the print menu of the web printing exclusive control window and the web printing exclusive viewer requests a page view up-count to the web server when selecting the print button.

6. The method of claim 1, wherein if a save button is selected from the print menu while the web page image is displayed in the web printing exclusive control window, further comprising: saving a web page with an advertisement related to a corresponding web page after the web printing exclusive viewer requests a page view up-count to the web server, the web page being automatically adjusted to be fit into the printing area of the web browser.

* * * * *